(12) United States Patent
Meyer et al.

(10) Patent No.: US 7,213,525 B2
(45) Date of Patent: May 8, 2007

(54) NOZZLE ASSEMBLY FOR PRODUCT-ON-DEMAND DELIVERY SYSTEM

(75) Inventors: Bradley John Meyer, Bismarck, ND (US); Donald Keith Landphair, Bettendorf, IA (US)

(73) Assignee: Deere & Company, Moline, IL (US)

( * ) Notice: Subject to any disclaimer, the term of this patent is extended or adjusted under 35 U.S.C. 154(b) by 94 days.

(21) Appl. No.: 10/839,733

(22) Filed: May 5, 2004

(65) Prior Publication Data

US 2005/0247806 A1    Nov. 10, 2005

(51) Int. Cl.
   *A01C 7/00*    (2006.01)
(52) U.S. Cl. ...................... 111/174; 221/203
(58) Field of Classification Search ................ 111/174, 111/177, 170, 77, 925; 221/211, 203, 200
   See application file for complete search history.

(56) References Cited

U.S. PATENT DOCUMENTS

| | | | | |
|---|---|---|---|---|
| 5,161,473 A | * | 11/1992 | Landphair et al. | 111/176 |
| 5,379,706 A | * | 1/1995 | Gage et al. | 111/175 |
| 5,392,722 A | * | 2/1995 | Snipes et al. | 111/174 |
| 6,047,652 A | | 4/2000 | Prairie et al. | |
| 6,298,797 B1 | * | 10/2001 | Mayerle et al. | 111/175 |
| 6,609,468 B1 | | 8/2003 | Meyer et al. | |
| 6,688,244 B1 | * | 2/2004 | Meyer et al. | 111/174 |
| 6,782,835 B2 | * | 8/2004 | Lee et al. | 111/174 |
| 6,845,724 B2 | * | 1/2005 | Mayerle et al. | 111/174 |

OTHER PUBLICATIONS

AGCO, White 6800 Series Central Fill Narrow Row Planting System, 1995, (2 pages).
Case Corporation, Case IH 1200 Pivot-Transport Split Row Planter, (2 pages).

* cited by examiner

*Primary Examiner*—Victor Batson
(74) *Attorney, Agent, or Firm*—The Law Office of Randall T. Erickson, P.C.

(57) ABSTRACT

A product-on-demand delivery system for an agricultural machine having a main hopper arrangement wherein each outlet nozzle of the main hopper nozzle manifold is connected to plural product hoses that are each in communication with an auxiliary product hopper of an application unit. The nozzle manifold includes an inlet for receiving pressurized air, and an outlet nozzle allowing air with entrained seed or product to exit the main hopper. The outlet nozzle includes a splitter portion, such as a Y-shaped fitting, having a single splitter inlet and two splitter outlets. The single splitter inlet is coupled to a nozzle portion of the outlet nozzle and the two splitter outlets are coupled to two product hoses that are each coupled to a respective application unit. An internal divider wall extends through the nozzle portion and partially through the splitter portion from the splitter inlet to the splitter outlets. The divider wall evenly divides flow of air and entrained seed or product between the two splitter outlets to the two application units.

20 Claims, 10 Drawing Sheets

NOZZLE ASSEMBLY FOR PRODUCT-ON-DEMAND DELIVERY SYSTEM

FIELD OF THE INVENTION

The present invention is directed to a product-on-demand delivery system having an improved nozzle assembly. Particularly, the invention is directed to a nozzle assembly for a bulk product hopper that delivers product to auxiliary hoppers of product application units of an agricultural machine.

BACKGROUND OF THE INVENTION

Pneumatic product-on-demand delivery systems have been used on agricultural seeding machines to automatically direct seed from a main seed hopper to a plurality of individual planting units. Each of the individual planting units has an auxiliary seed hopper for receiving the seed, a seed meter for metering the seed from the auxiliary seed hopper, and a furrow opener for forming a planting furrow into which the metered seed is deposited. A fan is used to create pressurized air that forms an air stream on which the seed is taken to the planting units. These systems automatically replenish the auxiliary hoppers as needed.

The commercially available seed-on-demand delivery systems typically require a large fan to create the air stream. The large fan is required because of the pressure losses in the pneumatic system caused by abrupt changes in direction by the air stream in the main hopper.

Another system is described in U.S. Pat. No. 6,609,468, herein incorporated by reference. In this system, a product-on-demand delivery system is configured wherein the air stream passing through the main hopper is not subjected to the abrupt changes in direction.

The product-on-demand delivery system comprises a frame having a main hopper and an application unit. An air pump directs pressurized air to a manifold where the pressurized air is distributed to a plurality of air supply hoses. The air supply hoses are coupled to air inlets located on the bottom of the main hopper. Opposite the air inlets are corresponding product outlets for receiving the air streams and product entrained in the air stream. The product outlets are coupled to product supply hoses that are in turn coupled to auxiliary hoppers located on the application units. The bottom of the main hopper is concave and has outwardly diverging side walls. The air inlet is downwardly angled relative to the bottom and the product outlet is upwardly angled relative to the bottom.

Peaked baffles are located above corresponding air inlets and outlets so that product puddles form beneath the baffles. Gaps are formed between adjacent baffles so that product from the main hopper can flow into the product puddles.

The product-on-demand delivery system advantageously supplies seed from a main seed hopper to auxiliary seed hoppers located on a planting unit. The planting unit would include auxiliary seed hoppers that each supply seed to a respective seed meter each of which directs metered seed to a planting furrow formed by a furrow opener.

The present inventors have recognized that it would be desirable to provide a product-on-demand delivery system that includes a less costly and a less mechanically congested main hopper. The present inventors have recognized that it would be desirable to provide a main hopper which could be minimized in length and which could be connected to an optimal number of auxiliary seed hoppers.

SUMMARY OF THE INVENTION

The present invention provides a product-on-demand delivery system for an agricultural machine with an improved main hopper arrangement wherein each outlet nozzle of the main hopper nozzle manifold can be connected to plural product hoses that are each in communication with an application unit of the machine. Preferably, each product hose is in communication with an auxiliary product hopper of each application unit.

According to the preferred embodiment, the nozzle manifold includes an inlet for receiving pressurized air, and an outlet nozzle allowing air with entrained seed or product to exit the main hopper. The outlet nozzle includes a splitter portion, such as a Y-shaped fitting, having a single splitter inlet and two splitter outlets. The single splitter inlet is coupled to, or formed with a nozzle portion of the outlet nozzle and the two splitter outlets are coupled to two product hoses that are each coupled to a respective application unit. An internal divider wall or partition extends through the nozzle portion and partially through the splitter portion from the splitter inlet to the splitter outlets. The divider wall is a relatively thin wall arranged substantially in a vertical plane within the outlet nozzle. The two splitter outlets extend axially at diverging angles as viewed in a horizontal plane, while both rise at the same angle, as viewed in vertical planes. The divider wall evenly divides flow of air and entrained seed or product between the two splitter outlets.

According to a preferred embodiment a seed-on-demand delivery system is provided for dispensing seed from a planting machine onto a field. The system includes a frame, a main seed hopper mounted on the frame, at least a pair of planting units, a splitter portion, a partition, an air pump and a pair of seed supply hoses.

The main hopper has a nozzle assembly into which seed in the main seed hopper is directed. The nozzle assembly has an air inlet and a seed outlet. The planting units are mounted to the frame. Each planting unit is provided with a seed meter for applying the seed to the field. The splitter portion has a splitter inlet and two splitter outlets. The splitter inlet is flow coupled to the seed outlet.

The partition is located within the splitter portion between the splitter inlet and the two splitter outlets. The partition separates flow into the splitter inlet to the two splitter outlets.

The seed supply hoses are respectively coupled to the splitter outlets of the splitter portion. The seed supply hoses are in flow-communication with the respective seed meters.

The air pump is pneumatically coupled to the air inlet of the nozzle assembly. The air pump generates pressurized air that is directed in the air inlet so that seed located in the nozzle assembly is taken up by the air stream as the air stream passes from the air inlet through the nozzle assembly to the seed outlet. The seed-entrained air flows through the splitter portion and through the pair of seed supply hoses. The seed supply hoses direct seed to the respective seed meter of the pair of planting units. Preferably, each planting unit is provided with an auxiliary seed hopper located between the respective seed supply hose and the seed meter.

Preferably, the splitter inlet and the two splitter outlets form a Y-shape and the seed outlet comprises a nozzle portion formed integrally with the splitter portion on an upstream end of the splitter portion. Preferably, the partition extends into the nozzle portion.

According to the invention the main product tank or hopper can feed twice as many application units with product, such as seed, given the same number of outlets. A reduction in outlet nozzle congestion at the main hopper is achieved.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
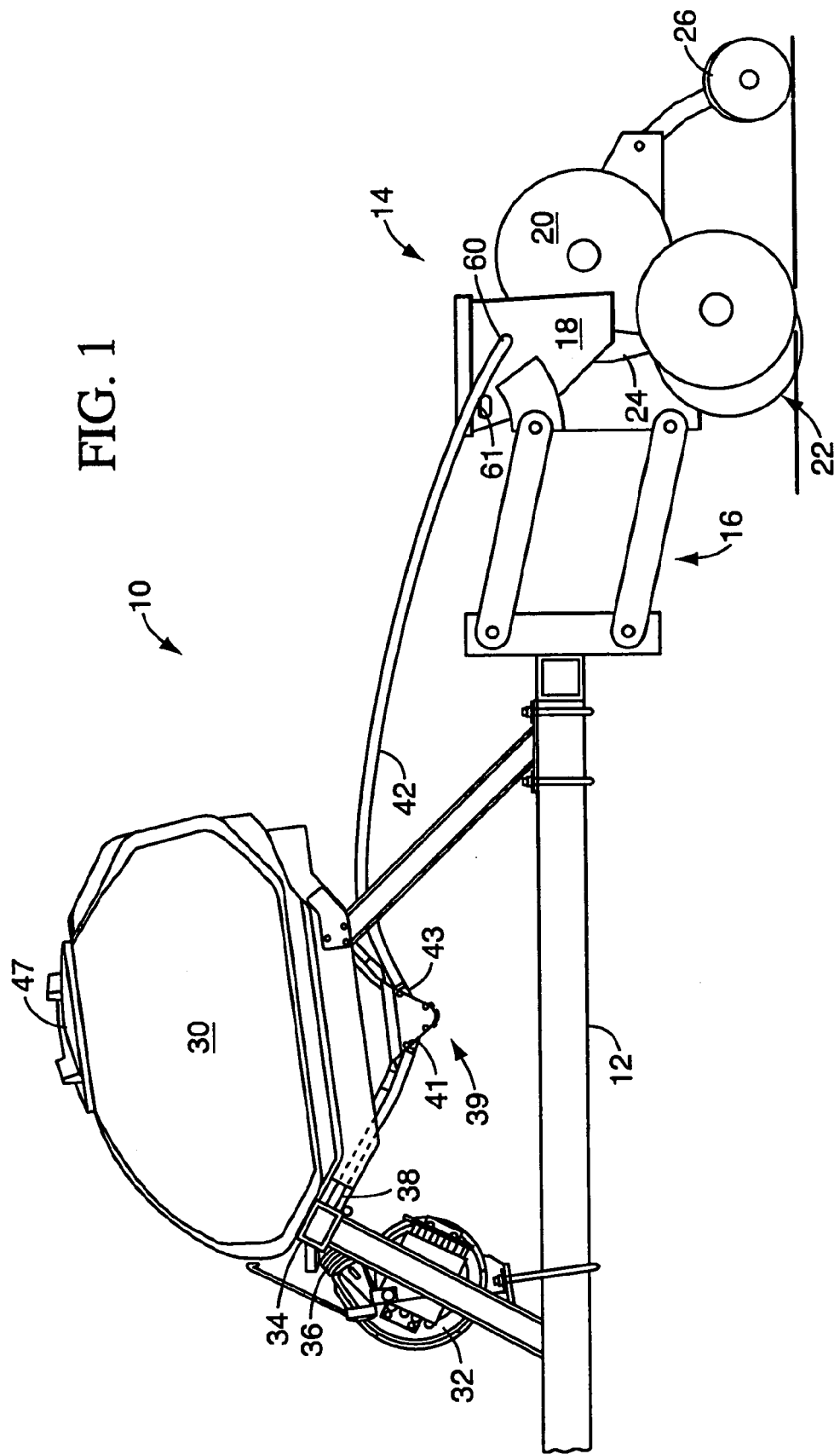
FIG. 1 is a side view of an agricultural planter using the subject product-on-demand delivery system.
Figure 2:
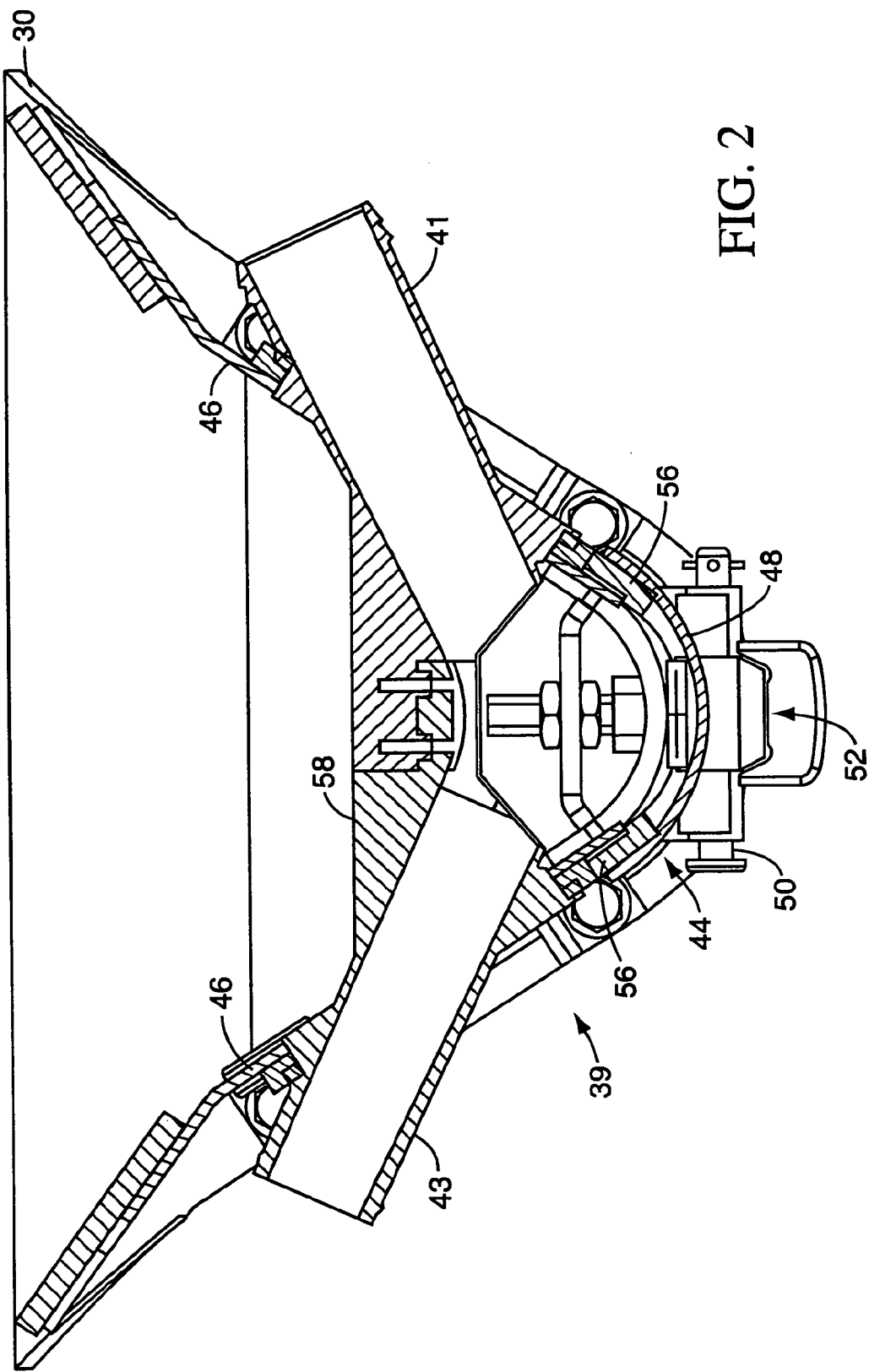
FIG. 2 is a side cross sectional view of the nozzle assembly of the product-on-demand delivery system.
Figure 3:
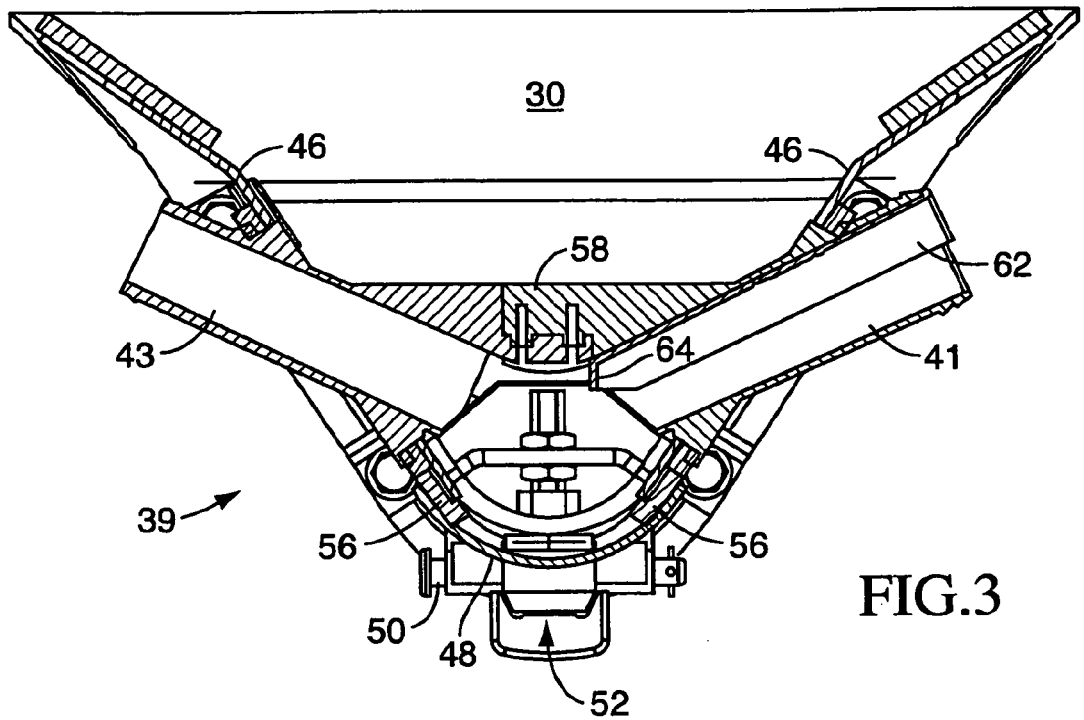
FIG. 3 is a side cross sectional view of the nozzle assembly of the product-on-demand delivery system having an air deflecting insert.
Figure 4:
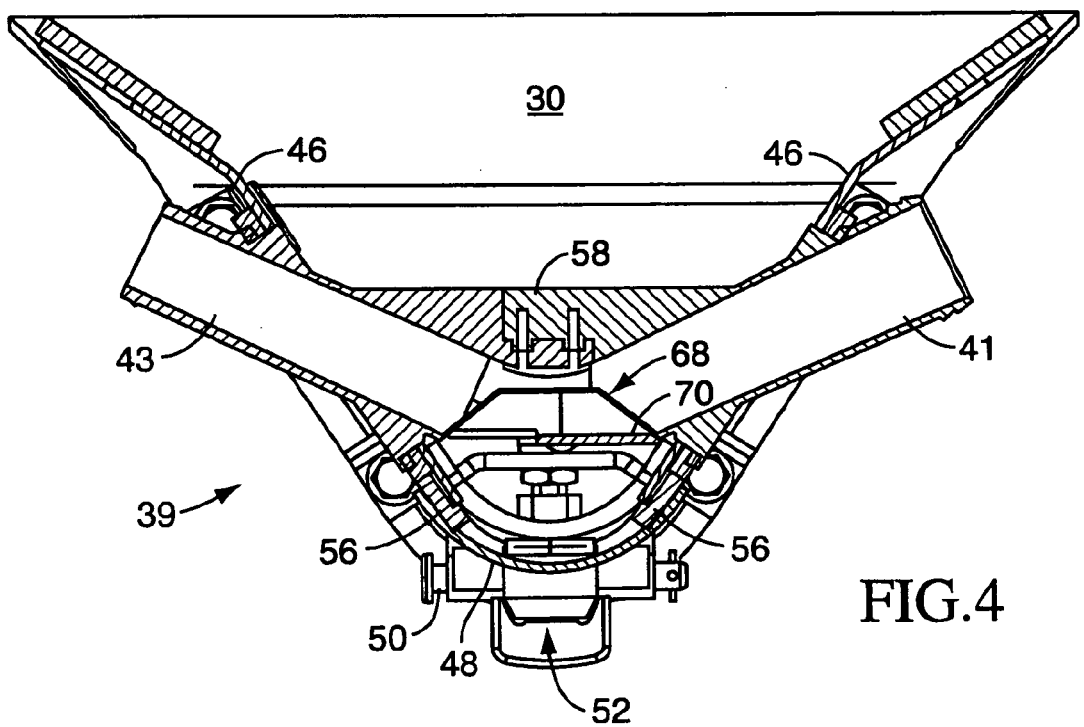
FIG. 4 is a side cross sectional view of the nozzle assembly of the product-on-demand delivery system having a product exposure limiting element.
Figure 5:
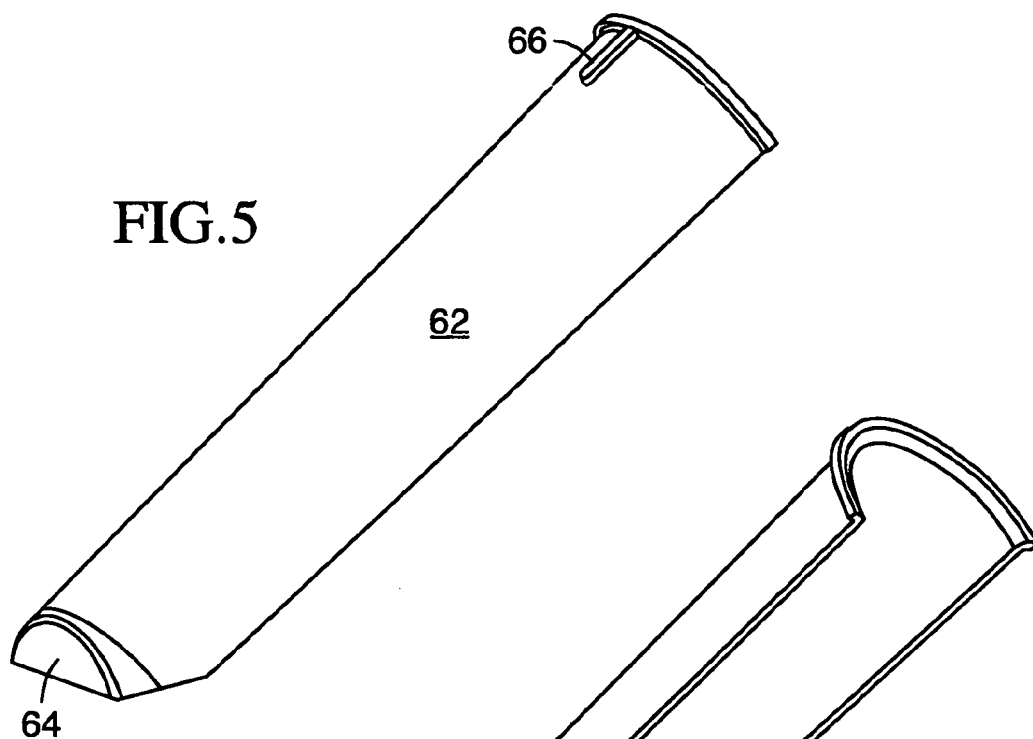
FIG. 5 is a top perspective view of the air deflecting insert.
Figure 6:
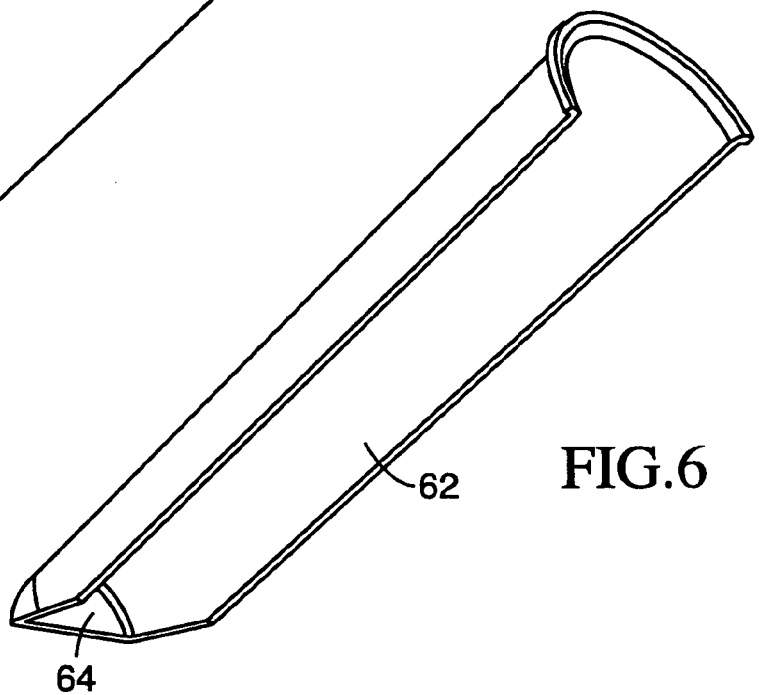
FIG. 6 is a bottom perspective view of the air deflecting insert.
Figure 7:
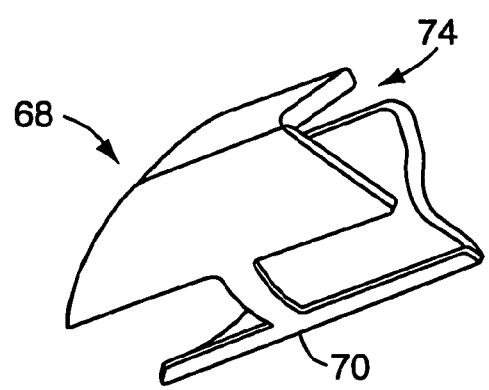
FIG. 7 is a bottom perspective view of the product exposure limiting element.
Figure 8:
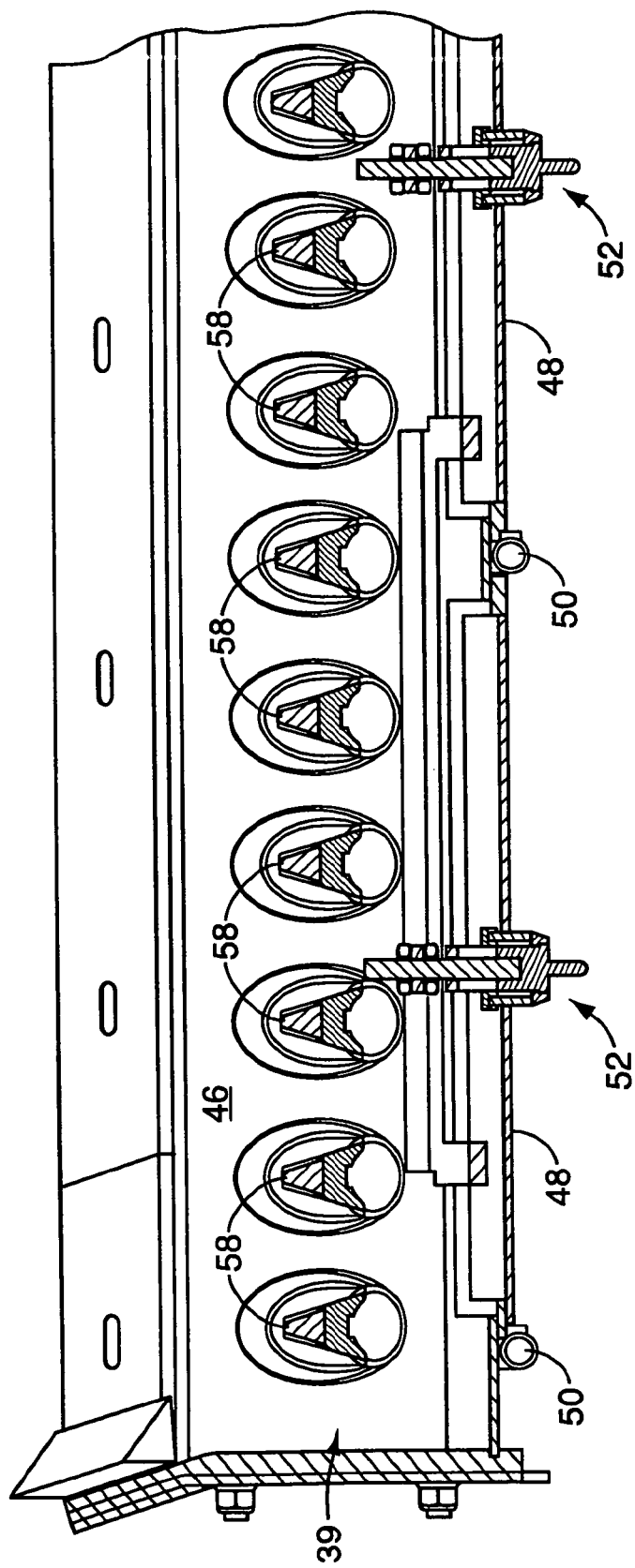
FIG. 8 is a front cross sectional view of the nozzle assembly of the product-on-demand delivery system.
Figure 9:
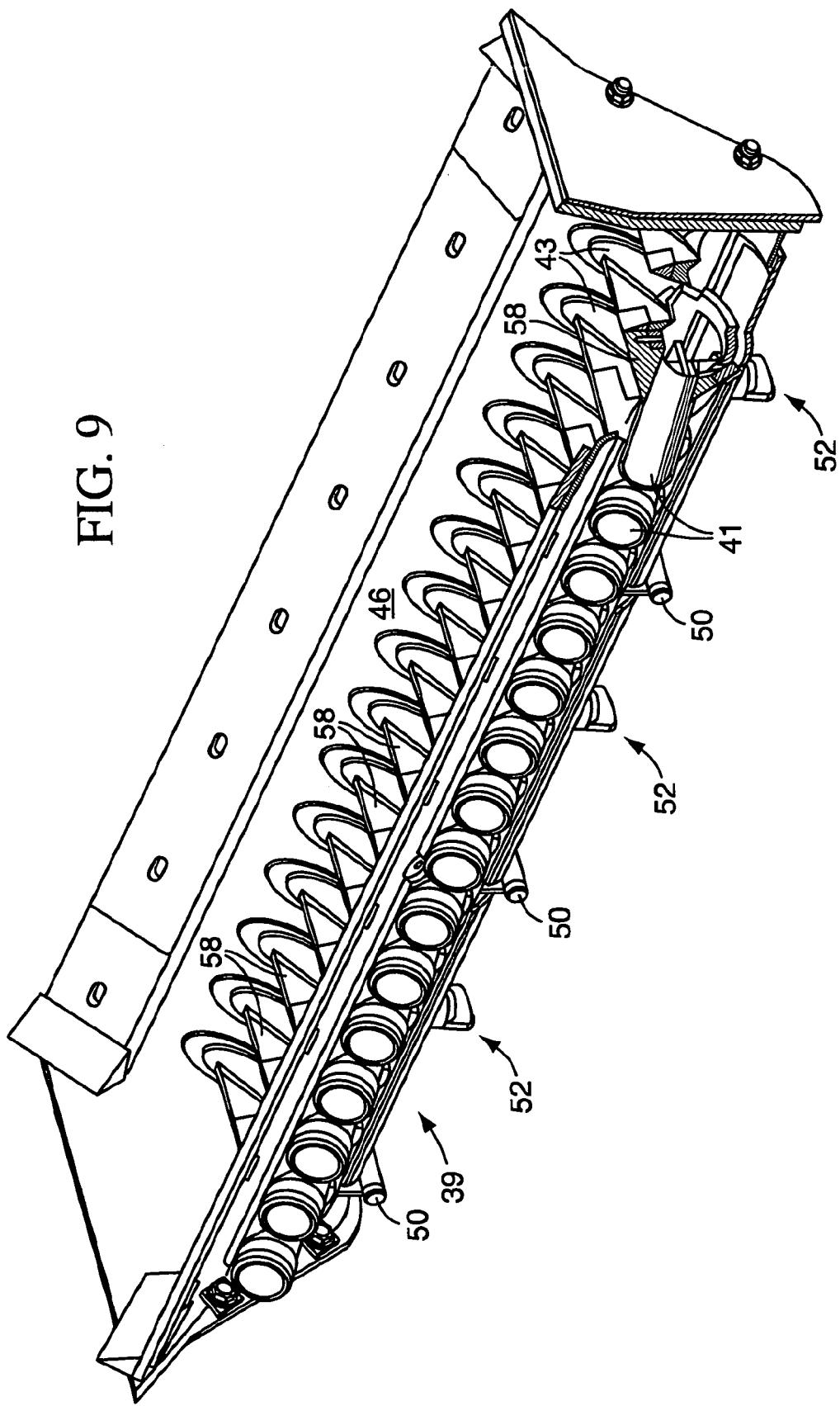
FIG. 9 is a front perspective and partial cross sectional view of the nozzle assembly of the product-on-demand delivery system.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An agricultural seeding machine 10 comprises a frame 12 on which are mounted a plurality of individual planting units 14. The planting units 14 are coupled to the frame 12 by a parallelogram linkage 16 so that the individual planting units 14 can move up and down to a limited degree relative to the frame 12. Each of the individual planting units comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter by a seed tube 24. A closing assembly 26 is used to close the planting furrow with the seed contained therein. In the preferred embodiment the seed meter 20 is a vacuum seed meter, although other types of seed meters using mechanical assemblies or positive air pressure could also be used with the subject invention. It should be noted that the present invention could also be used to apply non-seed products to the field. For seed and non-seed products, the planting unit could be considered an application unit with an auxiliary hopper for holding product, a product meter for metering product received from the auxiliary hopper and an applicator for applying the metered product to a field. For example a dry chemical fertilizer or pesticide could be directed to the auxiliary hopper and metered by the product meter and applied to the field by the applicator.

The main frame 12 supports a main hopper 30 and an air pump 32. The air pump 32 is driven by a hydraulic motor; however other motor arrangements could be used, like electric motors for driving the air pump 32. The air pump 32 directs pressurized air to a manifold 34 through main air hose 36. The manifold 34 is formed from a hollow closed tubular support of the main frame 12. The manifold 34 is provided with a plurality of manifold outlets corresponding to the number of planting units 14 mounted to the frame 12. Individual air supply lines 38 extend from the manifold outlets and direct pressurized air from the manifold 34 to the upstream side of the nozzle assembly 39. The nozzle assembly 39 is located at the bottom of the main hopper 30. Product located in the main hopper 30 flows by gravity to the nozzle assembly 39. The upstream side of the nozzle assembly 39 is provided with a number of air inlets 41 corresponding to the number of air supply hoses 38. The air inlets 41 are spaced transversely along the upstream side of the nozzle assembly 39. The downstream side of the nozzle assembly 39 is provided with a number of product outlets 43 corresponding to the number of air supply hoses 38. The product outlets 43 are also spaced transversely along the downstream side of the nozzle assembly 39. The product outlets 43 lie opposite the air inlets 41. Each air inlet 41 is aligned with a respective product outlet 43. Product supply hoses 42 extend from the product outlets 43 to the individual auxiliary hoppers 18 for directing product entrained in the air stream to the auxiliary hoppers 18.

The nozzle assembly 39 is provided with a concave bottom 44 having outwardly diverging sidewalls 46. Product in the form of seed or non-seed product is placed in the main hopper 30 through a lid 47. Portions of the nozzle assembly 39 can be opened to form a cleanout door 48 as described in U.S. Pat. No. 6,609,468.

Each air inlet 41 and corresponding product outlet 43 are formed from two plastic parts. The two plastic parts are pinned together by integral pins formed on one of the parts and receiving apertures formed on the other. The air inlet 41 is angled downwardly relative to the concave bottom 44 and correspondingly the product outlet 43 is angled upwardly relative to the concave bottom 44. An integral baffle 58 extends between the air inlet 41 and the product outlet 43. The baffle 58 is peaked and is located above the air stream passing from the air inlet 41 to the product outlet 43. The downwardly angled air inlet 41 prevents product from backing up into the air supply hose 38, whereas the upwardly angled product outlet 43 prevents product from flowing into and clogging the product supply hose 42.

Adjacent air inlet 41/product outlet 43 combinations are transversely spaced from one another so that product such as seed can pass on either side of the baffles 58 and puddle beneath the baffles 58. An air stream passing from the air inlet 41 to the product outlet 43 picks up product located in the puddle and directs it through product supply hose 42 to the auxiliary hopper 18. The transfer of product from the main hopper 30 to the auxiliary hoppers 18 is done automatically as product is needed by the auxiliary hopper 18. As an individual auxiliary hopper 18 fills up with product, the auxiliary hopper product inlet 60 becomes covered by product blocking and slowing the air stream so that the air stream no longer picks up product in the main hopper 30 and transports the product to the auxiliary hopper 18. Conversely, as product is used up by the product meter 20, the auxiliary hopper product inlet 60 is uncovered and the air stream again picks up product for delivery to the auxiliary hopper 18. In this way the auxiliary hoppers 18 are always and automatically provided with product. The side walls of the auxiliary hoppers 18 are provided with screen vents 61 for venting air pressure in the auxiliary hoppers 18. The vent screens 61 can also be located in the lids of the auxiliary hoppers 18 as long as the vent screens 61 are above the respective product inlets.

In some situations product having large particles, like large seeds (corn and soybeans), are difficult for the air stream to pick up. To accommodate large seed, the air inlet 41 may be provided with an insert 62 having an air stream deflecting portion 64 that deflects a portion of the air stream downwardly to agitate the seed in the seed puddle and capture the seed in the air stream passing into the product outlet 43. The insert is provided with a locating tang 66 that engages a slot formed in the air inlet 41 to correctly orient the insert 62 and the air deflecting portion 64.

In other situations the seed or non-seed product may be too light and will be readily carried by even a small air stream. To overcome this problem the baffles 58 may be provided with an element 68. The element 68 can be clipped on to the baffles 58. The element has an obstructing bottom 70 that limits the amount of product exposed to the air stream. Element 68 can be made of plastic. The upper gap 74 is opened so that the clip can be clipped to the baffle 58.

Figure 10:
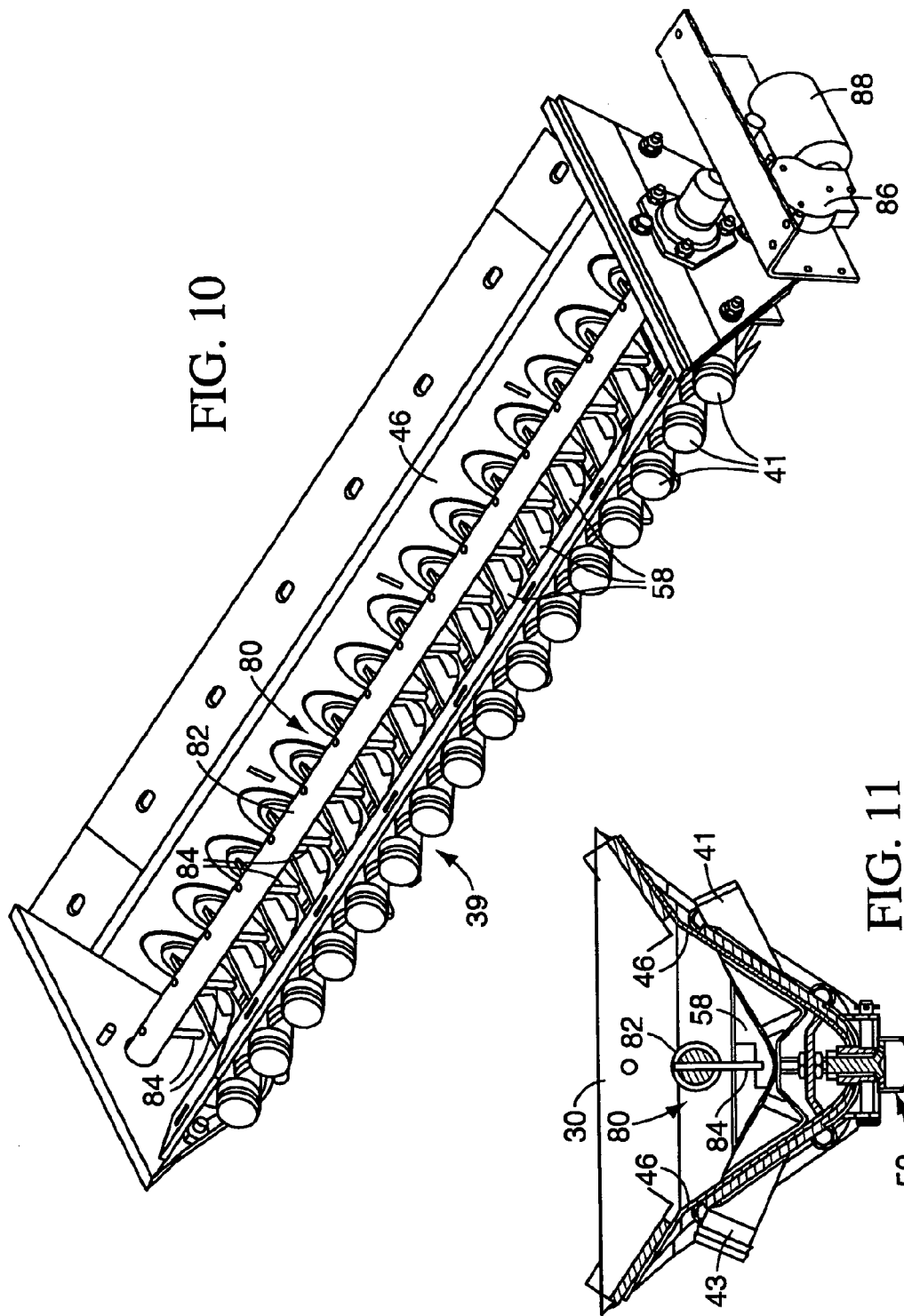
FIG. 10 is a front perspective view of the nozzle assembly being provided with an agitator assembly.

In an alternative embodiment, the large seed insert 62 can be eliminated in favor of an agitator assembly 80. The agitator assembly 80 comprises a transverse rod 82 extending across the nozzle assembly 39. The transverse rod 82 is provided with a plurality of radially extending fingers 84. As shown, in FIG. 10 the fingers are transversely aligned with one another.

The transverse rod 82 is rotated back and forth by an agitator drive 85 comprising a gearbox 86 being driven by a motor 88. Alternately, the motor 88 can be replaced by an electric clutch that selectively transfers rotary power to the gearbox from a mechanical drive. The mechanical drive can be, for example, a drivetrain that receives rotary power from a wheel of the frame that carries the hopper.

Figure 11:
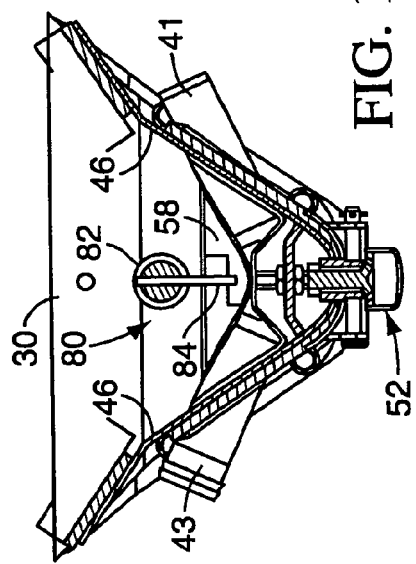
FIG. 11 is a cross sectional view of the nozzle assembly being provided with an agitator assembly.

At the bottom dead center position of the fingers 84 they extend between the individual nozzles defined by the aligned air inlets 41 and the product outlets 43. In this way the fingers 84 sweep the area between the nozzles. The gear box/motor assembly 86/88 drive the transverse rod fifty-one and one-half degrees in each direction from the bottom dead center illustrated in FIG. 11. As such, the fingers 84 sweep an arc of one-hundred three degrees.

Figure 12:
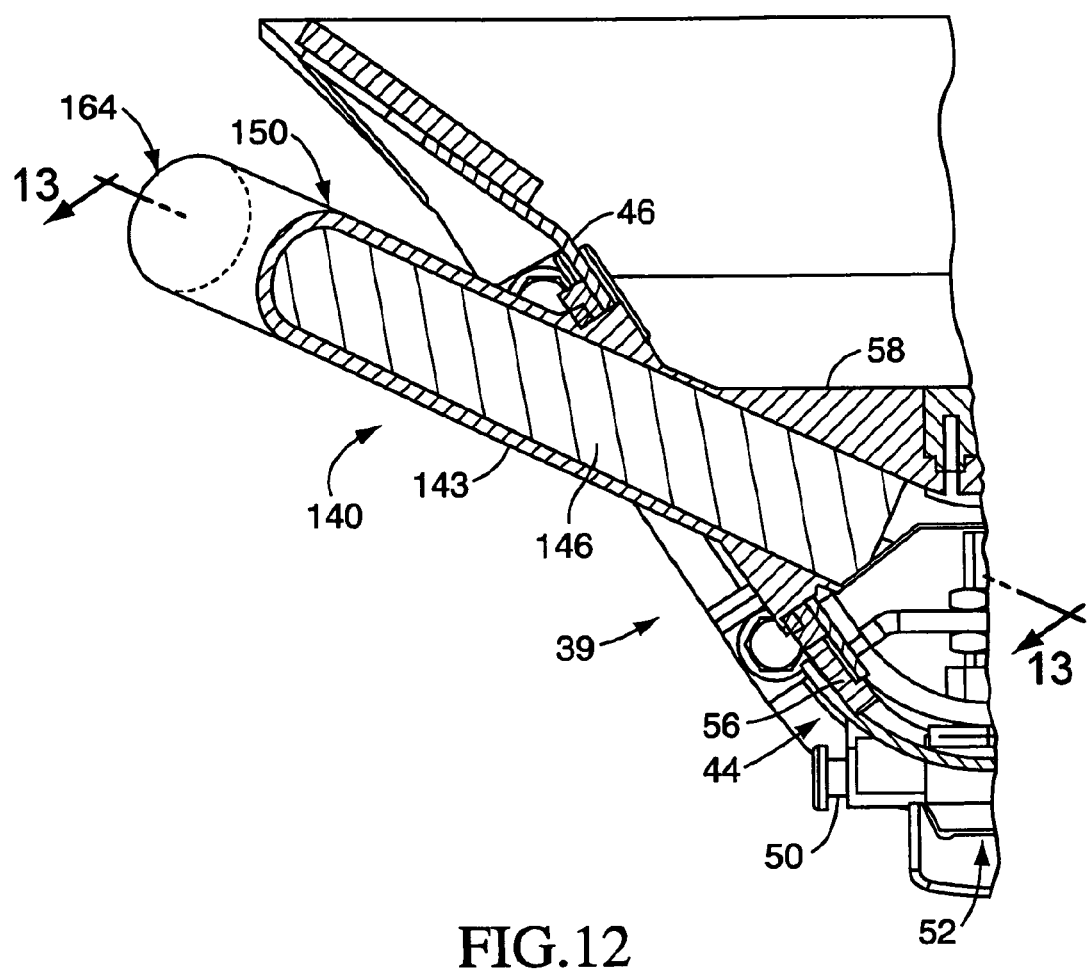
FIG. 12 is a fragmentary, half section of an alternate embodiment of the assembly shown in FIG. 2.
Figure 13:
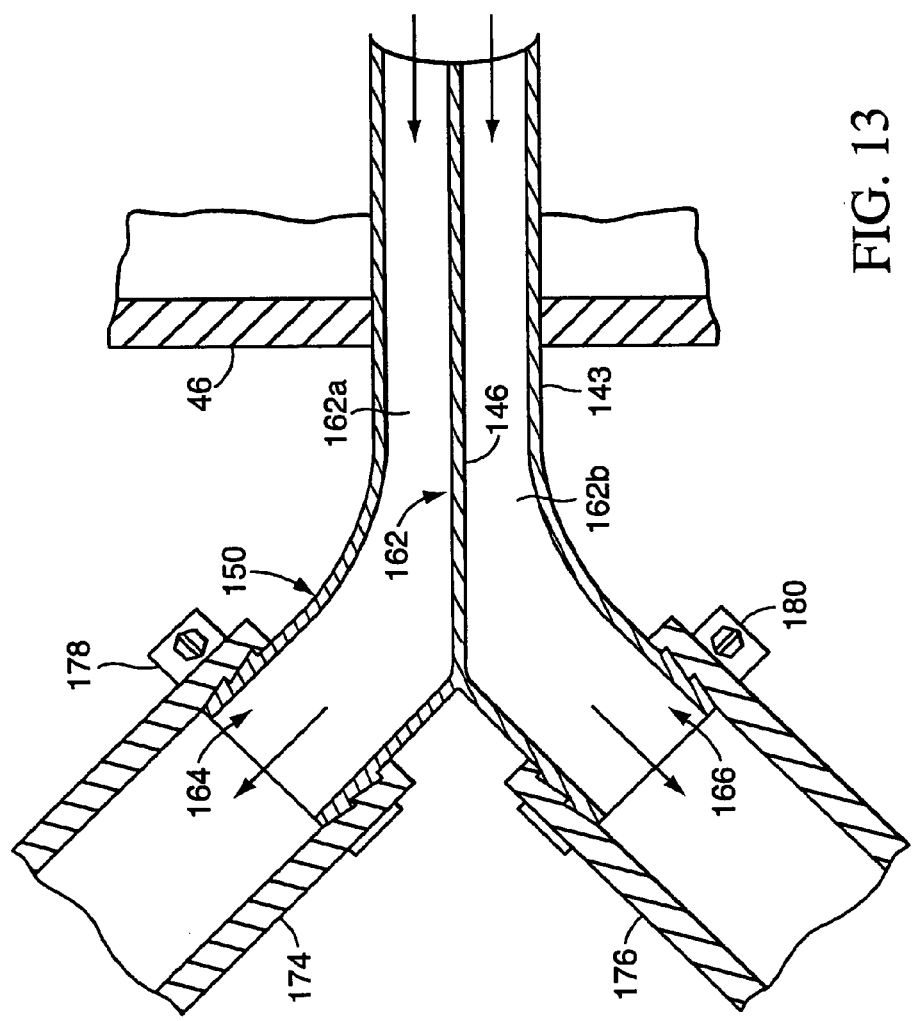
FIG. 13 is a cross sectional view taken generally along line 13—13 of FIG. 12.

FIGS. 12 and 13 illustrate an alternate product outlet nozzle 140. The outlet nozzle 140 includes a nozzle portion 143 extending from the sidewall 46. The outlet nozzle 140 includes an internal partition or divider wall 146 located within the nozzle portion 143 and oriented in a vertical plane. The internal partition 146 bisects the internal cross section of the nozzle portion 143.

The outlet nozzle 140 includes a splitter portion 150 that is formed with or coupled to the nozzle portion 143. Although the splitter portion is shown as a unitary part of the nozzle portion 143, it could also be formed separately as a fitting that is coupled to the nozzle portion 143. The partition 146 extends into the splitter portion 150. The splitter portion 150 has a splitter inlet 162, bisected into sections 162a, 162b by the partition 146 and two splitter outlets 164, 166. While the preferred embodiment is described and illustrated having two splitter outlets, the invention also encompasses a splitter fitting having three or more outlets as well.

The splitter outlets 164, 166 are clamped to product hoses 174, 176 by hose clamps 178, 180. Alternatively, quick connect fittings can be provided between the outlets 164, 166 and the hoses 174, 176. The product hoses 174, 176 are each coupled to separate application units 14 as shown in FIG. 14.

Figure 14:
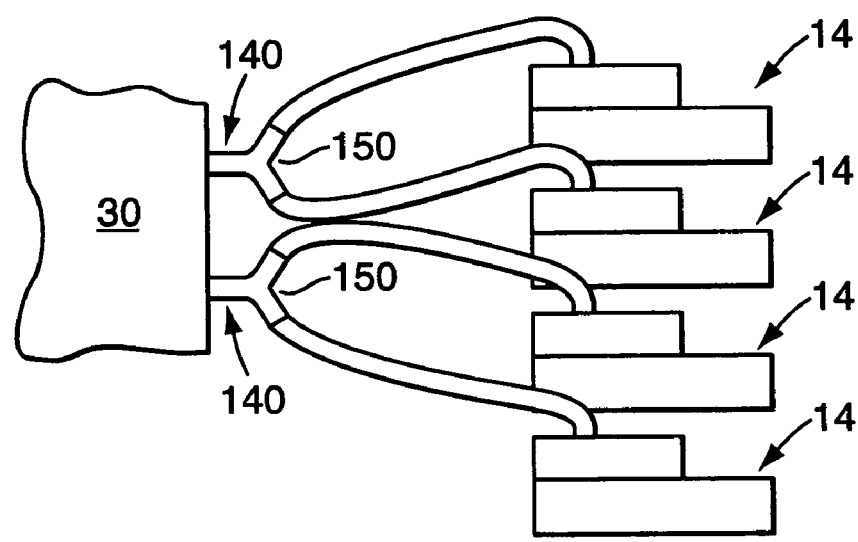
FIG. 14 is a fragmentary, schematic plan view of the product-on-demand delivery system of FIG. 1.

In comparison to the embodiment of FIG. 1, as illustrated in FIG. 14, each outlet nozzle 140 can feed two application units 14. Thus, only half as many outlets 140 as application units 14 need be provided on the main hopper.

The embodiment of FIGS. 12 through 14 reduces the amount of space required at the bottom of the product tank 30 by splitting the cross sectional area of the outlet nozzle vertically. Product, such as seed, is picked up and carried into the outlet nozzle in the same way, but the outlet nozzle is divided vertically to allow two product hoses and two application units to be fed with the same nozzle. The vertical divider wall ensures that no product or air flow can cross between sides of the nozzle, keeping each side separate. Without the divider, product may tend to plug one of the two hoses during operation. The air inlet to the nozzle is still of round cross section without a divider as the air flows straight through from the inlet to the outlet while picking up product.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A product-on-demand delivery system for agricultural product, said system comprising:
    a frame;
    a main hopper mounted on the frame, the main hopper having a nozzle assembly into which agricultural product in the main hopper is directed, the nozzle assembly having an air inlet and a product outlet;
    a pair of application units, each application unit is provided with a product meter for applying the product to a field;
    a splitter portion having a splitter inlet and two splitter outlets, said splitter inlet flow coupled to said product outlet;
    a partition within said splitter portion located between said splitter inlet and said two splitter outlets, said partition forming a barrier for dividing an air stream flowing into said splitter inlet to said two splitter outlets;
    a pair of product supply hoses, said product supply hoses are respectively coupled to said splitter outlets of said splitter portion, said product supply hoses in communication with the respective product meters;
    an air pump pneumatically coupled to the air inlet of the nozzle assembly, the air pump generates pressurized air that is directed into the air inlet so that agricultural product located in the nozzle assembly is taken up by an air stream passing from the air inlet through the nozzle assembly to the product outlet, through the splitter portion and through the pair of product supply hoses, the product supply hoses directing product to the respective product meter of the pair of application units;

wherein each application unit is provided with an auxiliary product hopper located between the respective product supply hose and the product meter; and wherein the nozzle assembly is provided with a plurality of baffles corresponding to the number of application units, the baffles extend between and above the respective product outlets, gaps being formed between adjacent baffles.

2. The product-on-demand delivery system according to claim 1, comprising an agitator assembly located in the nozzle assembly for agitating product located in the nozzle assembly, wherein the agitator assembly is provided with a plurality of fingers that extend into the gaps formed between adjacent baffles, said fingers move to agitate the product located in the nozzle assembly.

3. The product-on-demand delivery system according to claim 1, comprising an agitator assembly located in the nozzle assembly for agitating product located in the nozzle assembly, wherein the agitator comprises a transverse rod that is located above the baffles, the transverse rod having a plurality of fingers extending radially outward from the transversely extending rod, said plurality of fingers move to agitate the product located in the nozzle assembly.

4. The product-on-demand delivery system according to claim 3, wherein the fingers are transversely aligned on the transversely extending rod, wherein the transversely extending rod is rotated back and forth so that the fingers agitate the product located in the nozzle assembly.

5. The product-on-demand delivery system according to claim 1, wherein said splitter inlet and said two splitter outlets form a Y-shape.

6. The product-on-demand delivery system according to claim 5, wherein said product outlet comprises a nozzle portion formed integrally with said splitter portion.

7. A product-on-demand delivery system for agricultural product, said system comprising:

a frame;

a main hopper mounted on the frame, the main hopper having a nozzle assembly into which agricultural product in the main hopper is directed, the nozzle assembly having an air inlet and a product outlet;

a pair of application units, each application unit is provided with a product meter for applying the product to a field;

a splitter portion having a splitter inlet and two splitter outlets, said splitter inlet flow coupled to said product outlet;

a partition within said splitter portion between said splitter inlet and said two splitter outlets, said partition for dividing an air stream into said splitter inlet to said two splitter outlets;

a pair of product supply hoses, said product supply hoses are respectively coupled to said splitter outlets of said splitter portion, said product supply hoses in communication with the respective product meters;

an air pump is pneumatically coupled to the air inlet of the nozzle assembly, the air pump generates pressurized air that is directed into the air inlet so that agricultural product located in the nozzle assembly is taken up by an air stream passing from the air inlet through the nozzle assembly to the product outlet, through the splitter portion and through the pair of product supply hoses, the product supply hoses directing product to the respective product meter of the pair of application units;

wherein said product outlet comprises a nozzle portion formed integrally with said splitter portion, said partition extending into said nozzle portion.

8. A product-on-demand delivery system for agricultural product, said system comprising:

an implement frame that can be transported through a field;

a main seed hopper mounted on the frame, the main seed hopper having a nozzle assembly into which product in the main hopper is directed by gravity, the nozzle assembly having an air inlet coupled to an upstream sidewall, a downstream sidewall, a bottom and an outlet nozzle coupled to the downstream sidewall;

a pair of product supply hoses;

a pair of planting units, each planting unit is provided with a seed meter for metering seed and a furrow opener for forming a planting furrow into which metered seed is deposited, said pair of product supply hoses are coupled to the outlet nozzle and each hose is coupled to a planting unit product inlet that is in communication with the respective seed meter;

a partition within said outlet nozzle forming a barrier to divide an air stream flowing within said outlet nozzle to each product supply hose;

an air pump is pneumatically coupled to the nozzle assembly, the air pump generates an air stream that is directed into the air inlet so that the air stream passes from the air inlet through the nozzle assembly to the outlet nozzle so that seed located in the bottom of the nozzle assembly is taken up by the air stream and is directed by the outlet nozzle and the partition through the product supply hoses to the seed meters;

wherein each planting unit is provided with an auxiliary seed hopper located between the product inlet and the seed meter; and wherein the nozzle assembly is provided with a plurality of baffles, the baffles extend between and above the outlet nozzles so that the air streams from the air inlet pass beneath the baffles, and gaps are formed between adjacent baffles.

9. The product-on-demand delivery system according to claim 8, comprising an agitator assembly located in the nozzle assembly for agitating seeds located in the nozzle assembly, wherein said agitator assembly is provided with a plurality of fingers that extend into the gaps formed between adjacent baffles;

wherein the agitator comprises a transverse rod that is located above the baffles, the transverse rod having the plurality of fingers extending radially outward from the transversely extending rod;

wherein the fingers are transversely aligned on the transversely extending rod; and wherein the transversely extending rod is rotated back and forth so that the fingers agitate the product located between the baffles.

10. A product-on-demand delivery system for agricultural product, said system comprising:

an implement frame that can be transported through a field;

a main seed hopper mounted on the frame, the main seed hopper having a nozzle assembly into which product in the main hopper is directed by gravity, the nozzle assembly having an air inlet coupled to an upstream sidewall, a downstream sidewall, a bottom and an outlet nozzle coupled to the downstream sidewall;

a pair of product supply hoses;

a pair of planting units, each planting unit is provided with a seed meter for metering seed and a furrow opener for forming a planting furrow into which metered seed is deposited, said pair of product supply hoses are coupled to the outlet nozzle and each hose is coupled to a planting unit product inlet that is in communication with the respective seed meter;

a partition within said outlet nozzle to divide an air stream flowing within said outlet nozzle to each product supply hose;

an air pump is pneumatically coupled to the nozzle assembly, the air pump generates an air stream that is directed into the air inlet so that the air stream passes from the air inlet through the nozzle assembly to the outlet nozzle so that seed located in the bottom of the nozzle assembly is taken up by the air stream and is directed by the outlet nozzle and the partition through the product supply hoses to the seed meters;

wherein said outlet nozzle comprises a nozzle portion and a splitter portion extending on a downstream side thereof, said splitter portion having splitter outlets, said partition extending throughout a length of said nozzle portion and into said splitter portion to said splitter outlets.

11. The product-on-demand delivery system according to claim 10, wherein said partition is arranged to bisect said nozzle portion in a vertical plane.

12. The product-on-demand delivery system according to claim 11; wherein said nozzle portion, said splitter portion and said partition are formed as an integral unit.

13. The product-on-demand delivery system according to claim 10, wherein said nozzle portion, said splitter portion and said partition are formed as an integral unit.

14. The product-on-demand delivery system according to claim 10, wherein said splitter portion extends from said nozzle portion to said splitter outlets in a Y-shape.

15. A product-on-demand delivery system for delivering agricultural product, said system comprising:

a frame;

a main hopper mounted on the frame, and configured to hold a supply of agricultural product, the main hopper having a nozzle assembly into which the agricultural product in the main hopper is directed, the nozzle assembly including a plurality of air inlets and a corresponding plurality of product outlets and an opening between each pair of air inlet and product outlet to allow product to enter an air stream flowing between each pair of air inlet and product outlet;

a plurality of splitter portions each having an splitter inlet and two splitter outlets, each splitter inlet communicating with a respective product outlet, said splitter portions each having a partition between said splitter inlet and said two splitter outlets dividing an air stream passing into said inlet between said two splitter outlets;

a plurality of application units, each application unit is provided with a product supply hose, a product meter and an applicator for applying the agricultural product to a field, each product meter is coupled to one of said splitter outlets by one said product supply hose; and an air pump is pneumatically coupled to the air inlets, the air pump generates an air stream that passes through the air inlets and product outlets, so that agricultural product located in the nozzle assembly is automatically taken up by the air stream, through the product hoses and to the product meters.

16. The product-on-demand delivery system according to claim 15, wherein each application unit is provided with an auxiliary hopper located between the product supply hose and the product meter.

17. The product-on-demand delivery system according to claim 16, wherein gaps are located between the product outlets, wherein an agitator assembly is located in the nozzle assembly for agitating product located in the nozzle assembly, and wherein the agitator comprises a transverse rod that is located above the gaps, the transverse rod having a plurality of fingers extending radially outward from the transversely extending rod;

wherein the fingers are transversely aligned on the transversely extending rod; and wherein the transversely extending rod is rotated back and forth so that the fingers agitate the product located in the nozzle assembly.

18. The product-on-demand delivery system according to claim 15, wherein said splitter inlet and said two splitter outlets form a Y-shape.

19. The product-on-demand delivery system according to claim 18, wherein said product outlet comprises a nozzle portion formed integrally with said splitter portion.

20. The product-on-demand delivery system according to claim 15, wherein said product outlet comprises a nozzle portion formed integrally with said splitter portion.

* * * * *